United States Patent
Griesbach et al.

(10) Patent No.: US 6,373,005 B1
(45) Date of Patent: *Apr. 16, 2002

(54) JAMMING-DETECTION DEVICE

(75) Inventors: Peter Griesbach, Ostelsheim; Hans Gamerdinger, Weil der Stadt; Volker Petri, Aidlingen; Reinhold Mickeler, Altdorf, all of (DE); Michel Witte, Luxembourg (LU); Roland Lorig, Sinspelt; Stefan Schmitt, Trier, both of (DE)

(73) Assignees: I.E.E. International Electronics & Engineering, S.A.R.L., Route de Treves (LU); Daimler-Benz AG, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,559

(22) PCT Filed: Jul. 5, 1996

(86) PCT No.: PCT/US96/02965

§ 371 Date: Mar. 10, 1999

§ 102(e) Date: Mar. 10, 1999

(87) PCT Pub. No.: WO98/01645

PCT Pub. Date: Jan. 15, 1998

(51) Int. Cl.$^7$ .......................... H01H 3/16; E05F 15/10; E05F 15/16

(52) U.S. Cl. ............... 200/61.44; 200/61.43; 49/28

(58) Field of Search ................ 49/26, 27, 28; 200/64.41–61.44, 61.73–61.76, 61.81, 85 R, 86 R, 511, 512

(56) References Cited

U.S. PATENT DOCUMENTS 5,847,289 A * 12/1998 Lehnen .................. 73/862.381

* cited by examiner

Primary Examiner—Michael Friedhofer

(57) ABSTRACT

A device for detection of trapping in a power-operated closing element with a switching element, which is arranged along a first closing edge within an elastic hollow section. The hollow section includes a central area extending longitudinally, in which an active area of the switching element is arranged, and at least one side area extending longitudinally, in which a non-active edge area of the switching element is arranged. The side area has a higher deformability on the side of the hollow section facing the first closing edge than on the central area. The device has a force transmitter extending longitudinally, which transmits a trapping force from the side facing away from the first closing edge to the side area of the hollow section.

20 Claims, 2 Drawing Sheets

JAMMING-DETECTION DEVICE

FIELD OF THE INVENTION

Figure 1:
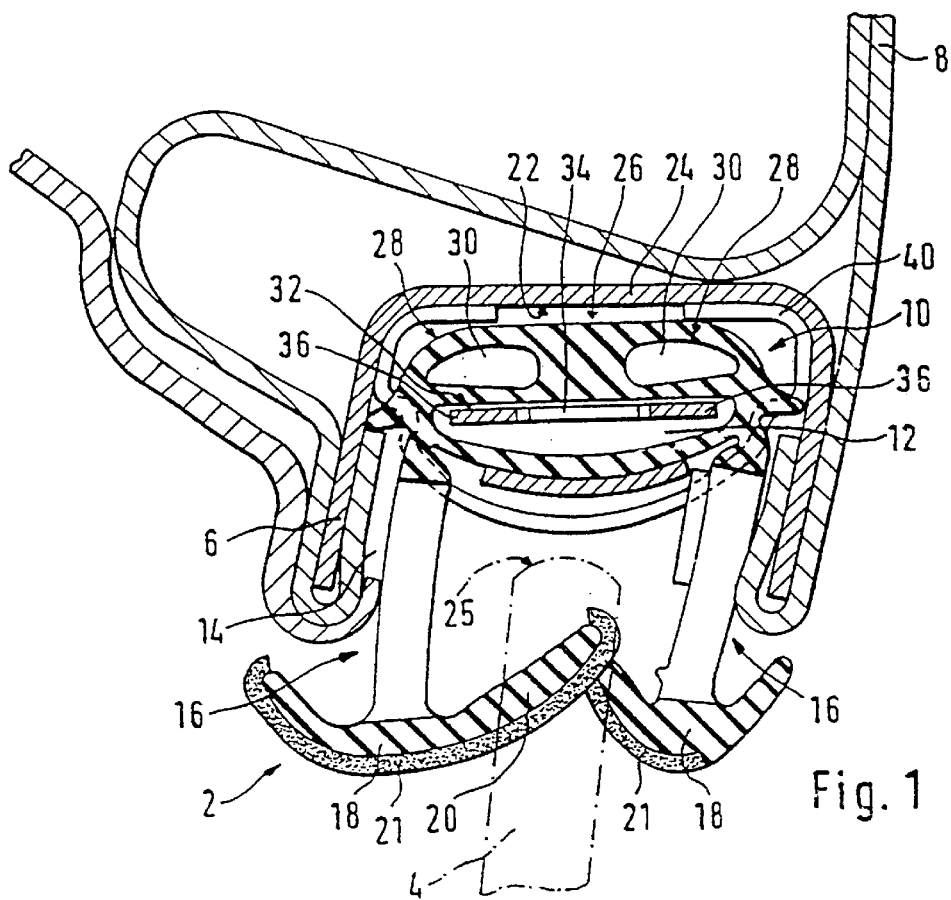

The invention relates to a device for detection of a trapping condition in a power-operated closing element. Devices of this type are used to switch off the drive unit of the closing element and if necessary reverse its movement in the event of a trapping condition arising, e.g. the trapping of a part of the body between two opposite closing edges. These anti-trapping devices are used, for example, on electrically operated window lifters and sliding roofs, automatic vehicle doors, e.g. in buses and trains, as well as in lift doors or the like.

BACKGROUND OF THE INVENTION

The well-known devices for detection of trapping are based essentially on two different methods of operation.

In a first type of anti-trapping device the information on possible trapping is taken from the power data of the drive unit for the closing element. In the case of electrical drives, for example, this is done by monitoring the motor current or torque output, both of which increase in the event of trapping. If a specific threshold value of the respective parameter is exceeded, the drive motor is switched off and, if necessary, the direction of movement is reversed. Problems are caused in these systems in particular by friction losses of the closing element on guide devices and sealing elements for the closing element. These friction losses are heavily dependent on external factors such as outside temperature or lubrication condition, which leads to wide variation of the monitored drive characteristic values and frequent faulty tripping.

In a second type of anti-trapping device pressure-operated switching elements are used, which are arranged on a closing edge and switch off or reverse the drive unit of the closing element when pressure is applied. LU-A-87 942 describes, for example, an anti-trapping device in which a film pressure sensor is mounted on the closing edge of the closing element. If an obstacle is in the path of movement of the closing element, the film pressure sensor is tripped by direct application of pressure when the obstacle is struck and the drive control of the closing element reverses the direction of movement of the latter. An arrangement of this type is characterised by an extremely high probability of response, but problems are caused in this arrangement by the direct transmission of the trapping force to the active area of the actual switching element. In fact, moving obstacles in particular may exert heavy impacts on the switching element and destroy the latter.

DE-PS-33 47 945 describes a moulding on the closing edge of a moving closing element, in which a closing force is transmitted via several segments, some of which are arranged in a V-shape, to a switching rib. The switching rib is forced in the direction of the closing force on to the switching element and trips the latter by direct application of pressure. Although the closing force is transmitted via segments and a switching rib to the switching element with this moulding, with the result that the actual switching force exerted on the switching element is easily reduced, impacts nevertheless cause significant displacement of the switching rib towards the switching element. However, this in turn produces inadmissibly high direct loading of the active area of the switching element, which leads to its destruction.

SUMMARY OF THE INVENITON

Consequently, the task of the present invention is to propose a device for detection of a trapping condition in which direct application of a trapping force to the switching element is prevented.

According to the invention this problem is solved by a device for detection of trapping in a power-operated closing element with a switching element which is arranged along a first closing edge within an elastic hollow section. The hollow section comprises a central area extending longitudinally, in which an active area of the switching element is arranged, and at least one side area extending longitudinally, in which a non-active edge area of the switching element is arranged, the side area on the side of the hollow section facing the first closing edge being more deformable than the central area. The device also has a longitudinally extending force transmitter, which transmits a trapping force essentially at right angles to the side area of the hollow section. It should be noted that the first closing edge may belong to a moving closing element and also to a fixed element which interacts with the closing element when it is closed to close an opening.

Consequently the device according to the invention is characterised by transmission of the trapping force to the side area of the hollow section instead of directly to the active area of the switching element. This ensures that the side area of the hollow section in the area of the point of attachment of the force transmitter is deformed towards the trapping force, the central area largely retaining its shape because of the relatively smaller deformability. The switching element is thus deflected in its edge area towards the trapping force, so that the dimensionally stable central area of the hollow section exerts a switching force on the active area of the switching element, which acts in the opposite direction to the trapping force. If the closing element is withdrawn from the trapping position, which is effected by reversal of the drive device, the trapping force diminishes and the hollow section resumes its original shape because of its elasticity. Consequently the pressure exerted by the central area of the hollow section on the active area of the switching element diminishes, and the switching element opens.

The important advantage of the indirect tripping of the switching element is that the maximum deflection of the edge area of the switching element and thus also the switching force exerted by the central area of the hollow section on the active area of the switching element can easily be limited without impairment of the response of the device. This is done by limiting the maximum deformation of the side area of the hollow section by suitable design of the side area.

The higher deformability of the side area in relation to the central area may be achieved, for example, by making the side area from a softer material than the central area. Suitable material selection and appropriate dimensioning of the thickness of the side area ensure that the side area can initially be deformed very easily, which ensures high response probability but with increasing deformation exerts a greater counter-force and thus limits further deformation.

In an alternative design of the hollow section the central area and side area are made from the same material. In this case the side area has a longitudinal hollow chamber, which absorbs the deformation of the side area, in its wall facing the closing edge. After this hollow chamber has been fully compressed by a trapping force, a side area designed in this way cannot absorb any further deformation.

To allow particularly accurate transmission of the switching force to the active area of the switching element, the central area has a longitudinal elevation, which projects into the hollow space of the hollow section, preferably on the side of the hollow section facing the first closing edge. The switching force exerted by the central area is then transmitted locally by this elevation to the switching element, so that tripping of the switching element already takes place reliably with very small deflection of its edge area. Consequently this measure significantly improves the response of the device.

The hollow space in the central area is preferably curved concavely outwards on its side facing away from the first closing edge. If the side area is deformed by a trapping force, the wall of the hollow space in the side area facing away from the first closing edge may be displaced towards the switching element. Undesirable direct tripping of the switching element can be prevented by the curved design of the hollow space on this wall.

The force transmitter is advantageously connected on the side of the hollow section facing away from the first closing edge in one piece to the side area of the hollow section. Consequently the force transmitter forms with the hollow section a unit which can be easily manufactured and assembled. The connection point of the force transmitter is preferably selected in such a way that lateral deflection of the free end of the force transmitter does not constrict the hollow space of the hollow section.

In a preferred embodiment of the invention the device comprises a spacer, which in an area of the hollow section on the side of the switching element facing away from the first closing edge extends over the latter's active area. This spacer comprises, for example, an impact buffer made from dimensionally stable material, which extends essentially at right angles to the first closing edge through suitable openings in the hollow section and the switching element, a first end of the impact buffer resting on the first closing edge and a second end of the impact buffer extending beyond the switching element. The second end of the impact buffer may lie within the hollow space of the hollow section or project from the hollow section through a suitable opening in its wall facing away from the first closing edge. This impact buffer prevents a second closing edge, which is opposite the first closing edge when the closing element is closed, from imposing a direct load on the switching element.

In a preferred form of construction the impact buffer comprises a sleeve arranged essentially at right angles to the first closing edge and a rivet, which can be introduced into the sleeve, the inside diameter of the sleeve corresponding essentially to the outside diameter of the rivet shank and the length of the latter being smaller than the depth of the sleeve hole. This two-part design allows the buffer to be assembled particularly easily. In addition an area of the sleeve hole is not filled by the rivet shank after assembly of the impact buffer. If the sleeve is designed with thin walls, this unfilled area of the sleeve imparts a certain flexibility to the impact buffer, so that the closing element is gently braked when the second closing edge strikes the impact buffer. This, of course, has a protective effect on the entire drive mechanism of the closing element on the one hand, and the noise generated when the second closing edge strikes the buffer is clearly reduced on the other.

To prevent direct stressing of the switching element by the second closing edge, the device comprises in an alternative embodiment a spacer in the form of a clamp made from dimensionally stable material, which encloses the hollow section from the side facing away from the closing edge and is supported by the first closing edge. The clamp is preferably designed in such a way that its shape is adapted to the outer shape of the hollow section with a certain clearance, so that the assembled clamp does not exert any pressure on the hollow section wall facing away from the first closing edge. In order to enclose only the hollow section and not the force transmitter, the clamp is guided laterally through suitable openings in the force transmitter, the openings being designed in such a way that transmission of a trapping force is not impaired. The important advantage of the clamp compared to the impact buffer is that the hollow section need not be drilled when fitting the clamp and the hollow space consequently remains tight. This ensures optimum protection of the switching element arranged in the hollow section against dust and other contaminants. With regard to reduction of noise the clamp is preferably made from an elastic material such as metal or plastic.

A particularly advantageous embodiment of the invention is characterised by a second force transmitter extending longitudinally, which is connected on the hollow section side facing away from the first closing edge to a second lateral area and transmits a trapping force essentially at right angles to the second side area of the hollow section, and by a membrane made from flexible material, which extends at a certain distance from the hollow section between the first and second force transmitter. The second closing edge is introduced between the two force transmitters when the closing element is closed and enters the membrane. Firstly, the closing element is braked without imposition of a direct load on the switching element and, secondly, the two force transmitters experience a lateral force in the direction of the second closing edge. This is particularly advantageous if the force transmitters have sealing lips which are simultaneously intended to perform a sealing function against the second closing element. The sealing lip of each force transmitter is pressed firmly against the second closing element by the force acting laterally in the direction of the second closing element, so that the sealing effect is significantly improved.

It should be noted that the use of spacers to avoid direct stressing of the switching element by the closing element is made possible only by the arrangement of the switching element and force transmitter according to the invention. In fact a spacer of this type can be used effectively only if the force transmitter as the tripping element of the device is not arranged directly in the path of the closing element.

The switching element preferably comprises a film pressure sensor known under the name "force sensing resistor". Sensors of this type consist of two plastics films glued to each other, spacers being affixed between the films. Electrode paths which mesh with each other in the active area of the sensor are mounted on one of the two films. The second film is coated with a semi-conductor polymer, which establishes an electrical contact between the two meshed electrodes when pressure is applied to the sensor. The higher the pressure applied, the greater the compression of the conductive particles in the polymer and the smaller becomes the resistance of this electrical contact.

A specific embodiment of the invention will now be described below with reference to the enclosed figures. A device for detection of trapping in an electrically operated side window of a motor vehicle is involved.

BRIEF DESCRIPTION OF THE PREFERRED EMBODIMENTS

Figure 2:
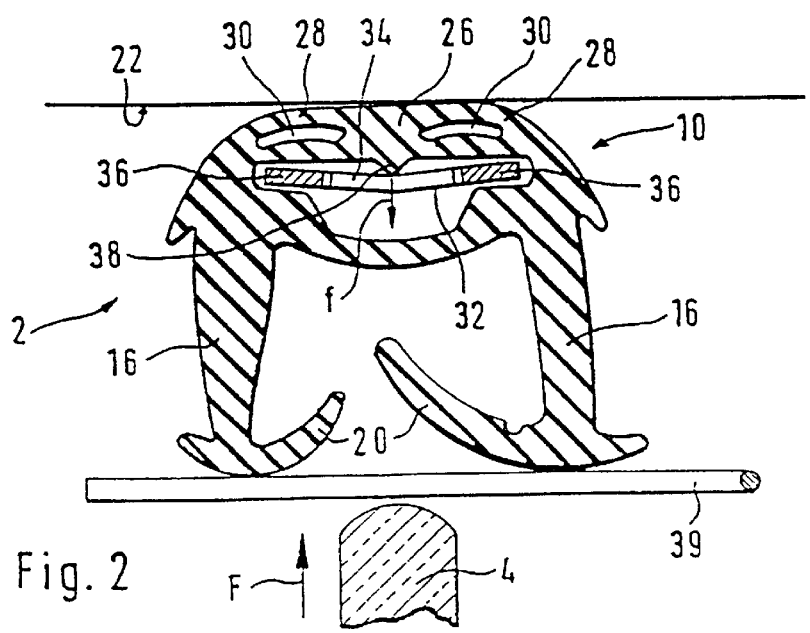
Figure 3:
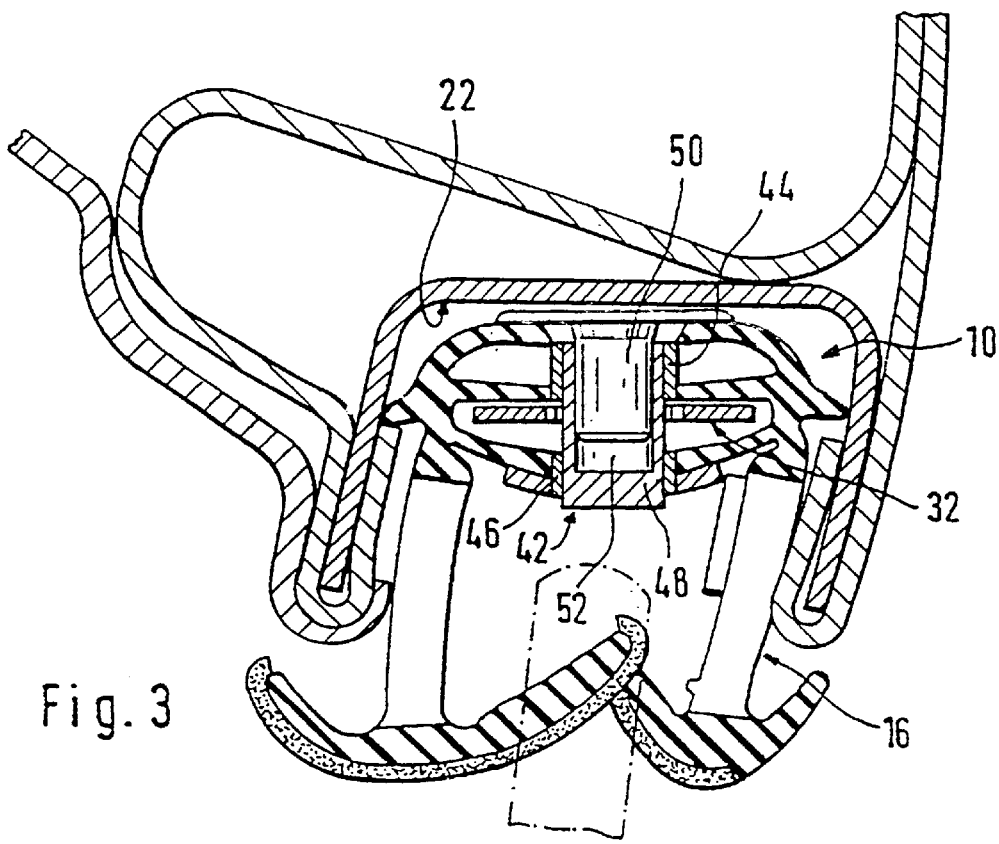
Figure 4:
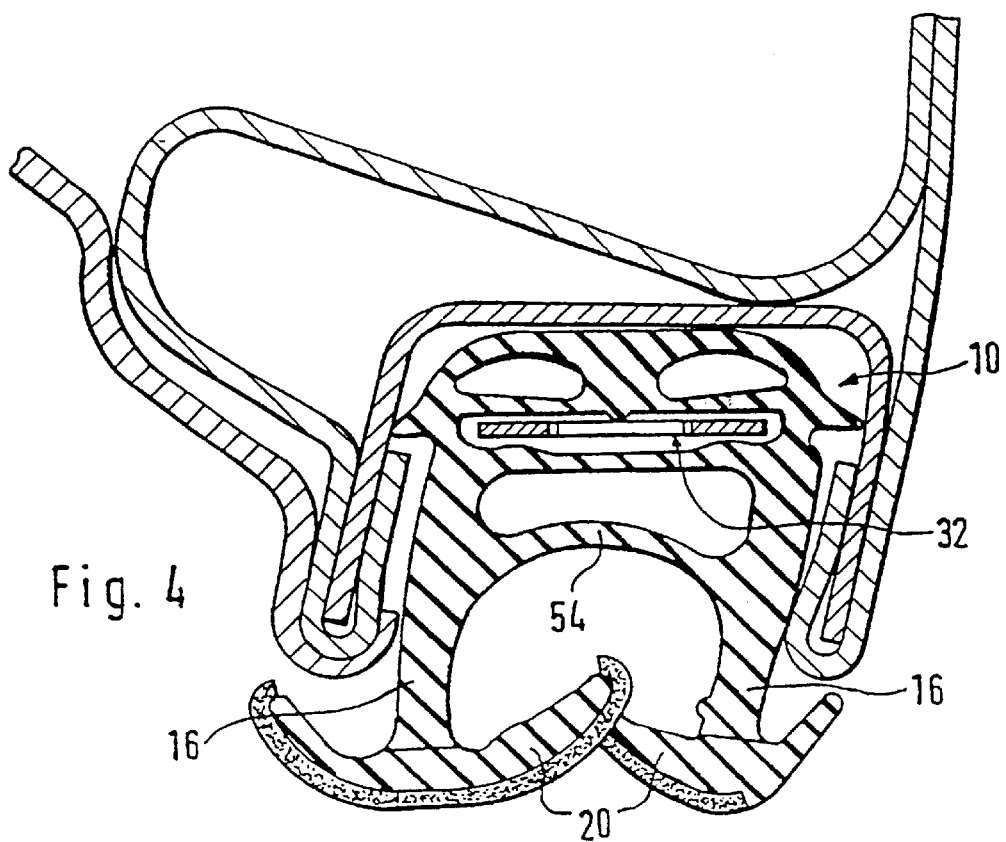

FIG. 1 shows a cross-section through an anti-trapping device with a spacer;

FIG. 2 a schematic representation of a case of trapping;

FIG. 3 a cross-section through an anti-trapping device with an impact buffer;

FIG. 4 a cross-section through an anti-trapping device with a retracted membrane.

DETAILED DESCRIPTION OF THE PREFERRED EMBODIMENTS

The device for detection of trapping described in FIG. 1 is designed as a sealing section 2 for a side window 4 of a motor vehicle and arranged in a profiled window frame 6 in a vehicle door 8. The seal section 2 comprises essentially a hollow section 10 made from elastic material with a hollow space 12, which is protected in a recess 14 in the frame 6, and two legs 16 extending on both sides of the side window 4, which guide and seal the window 4 during closing. The free ends 18 of the two legs 16 also each have a flexible sealing lip 20 on the side facing the window 4, which contact each other when the window 4 is open and thus prevent the penetration of contaminants into the interior of the sealing section 2. When the side window 4 is closed the two sealing lips 20 are forced apart by the window 4, with the result that they rest against the window 4 with a sealing effect because of their elasticity. To prevent generation of noise when the side window 4 slides along, the sealing lips 20 are provided with a flock coating 21 on their side facing the window 4.

The hollow section 10 is arranged along a first closing edge 22, which is formed by the base 24 of the recess 14 and is opposite a second closing edge 25 on the side window 4 when the latter is closed. The hollow section comprises a central area 26 extending longitudinally (i.e. at right angles to the plane of the drawing) and in each case a side area 28 extending longitudinally. The two side areas 28 of the hollow section are designed in such a way that they have a significantly higher deformability than the central area 26. In the case described this was achieved by construction of a hollow chamber 30, which extends along the entire hollow section 10, in each of the side areas 28. With a force effect at right angles to the closing edge 22 these hollow chambers 30 are compressed, so that the respective side area 28 deforms relatively easily. It should be noted that a higher deformability of the side areas 28 in relation to the central area 26 can also be achieved by manufacturing the side areas 28 from a softer material than the central area 26.

The hollow space 12 of the hollow section 10 extends on the side of the hollow chambers 30 facing away from the closing edge 22 in a transverse direction over the entire central area 26 and laterally into the respective side areas 28, whereas in the longitudinal direction it runs along the entire hollow section. The wall of the hollow space 12 facing the closing edge 22 is essentially flat, whereas the opposite wall curves towards the window 4. The width of the hollow space 12 and its height at the lateral edges are dimensioned in such a way that a switching element 32, e.g. a film pressure sensor, is held in the hollow space 12 with little lateral and vertical play.

The film pressure sensor 32 should be tripped in the case of trapping in order to switch off a drive mechanism for the side window 4. For this purpose the film pressure sensor 32 comprises an active area 34, which extends laterally, centrally along the hollow space 12, and a non-active edge area 36 on each side. The film pressure sensor 32 with its non-active edge areas 36 is held laterally in the hollow space 12, so that it is secured against slipping and rotation.

A case of trapping is shown schematically in FIG. 2. As an obstacle 39 is present between the side window 4 and the sealing section 2, the side window 4 cannot be introduced between the two legs 16. The closing force represented by the arrow F is consequently transmitted as a trapping force to the legs 16 connected to the respective side area 28 of the hollow section 10, which conduct the trapping force F to the respective side area 28. Each leg 16 thus acts as a force transmitter between an obstacle 39 and the respective side area 28 of the hollow section 10. Consequently the side area 28 of the hollow section 10 is deformed in the area of the point of attachment of the leg 16 in the direction of the trapping force F, the central area 26 largely retaining its shape because of the relatively smaller deformability. The film pressure sensor 32 is thus deflected in its edge area 36 towards the trapping force F, so that the dimensionally stable central area 26 of the hollow section 10 exerts a switching force (indicated by the arrow f) on the active area 34 of the film pressure sensor 32, which acts in the opposite direction to the trapping force F. If the side window 4 is withdrawn from the clamping position, which is effected by reversal of the drive, the trapping force F diminishes and the hollow section 10 resumes its original shape because of its elasticity. Consequently the pressure exerted by the central area 26 of the hollow section 10 on the active area 34 of the film pressure sensor 32 diminishes and the film pressure sensor 32 opens.

To allow accurate transmission of the switching force f to the active area 34 of the film pressure sensor 32, the wall of the hollow space 12 facing the closing edge 22 preferably has a central elevation 38 extending longitudinally and designed as a switching cam, which projects into the hollow space 12 of the hollow section 10. This switching cam 38 transmits the switching force exerted by the central area locally to the film pressure sensor 32, so that the latter is already reliably tripped with an extremely small deflection of its edge area 36.

A further special feature of the device in FIG. 1 is the spacer 40, which prevents direct stressing of the active area 34 of the film pressure sensor 32. This spacer 40 in the form of a clamp made from dimensionally stable material encloses the hollow section 10 from the side facing away from the first closing edge 22 in order to rest on the first closing edge 22. The clamp 40 is preferably designed in its area facing the window 4 in such a way that its shape adapts to the outer shape of the hollow section 10 with a certain clearance, while it advantageously has the shape of the recess 14 in the area facing the closing edge 22. To ensure that the clamp 40 encloses only the hollow section 10 and not the legs 16, it is led laterally through suitable openings in the legs 16. The lateral openings in the legs 16 must be designed in such a way that transmission of a trapping force is not impaired.

The clamp 40 is preferably made from steel sheet, with the result that it has a certain elasticity. When the side window 4 runs against the clamp 40 it is consequently braked gently, which protects the drive of the window 4 and counteracts any generation of loud noise.

It should be noted that the clamp 40 does not extend over the full length of the hollow section 10, but only locally on a short section. In fact a short spacer 40 positioned on a portion of the full length of the hollow section 10 is generally already adequate for effective prevention of direct loading of the film pressure sensor 32 by the window 4.

An anti-trapping device with an impact buffer 42 is shown in FIG. 3. The hollow section 10 and legs 16 are essentially of the same design in this anti-trapping device as in FIG. 1. Differences from the section 10 in FIG. 1 result only in the area of an impact buffer 42, which like the clamp 40 is arranged only locally at a few points over the length of the hollow section 10. In this area both the central area 26 of the hollow section 10 and the film pressure sensor 32 are provided with a hole 44, which extends essentially at right angles to the first closing edge 22. The diameter of the hole 44 must be so small that the two electrode paths of the film pressure sensor 32 meshed with each other are not fully separated, so that the film pressure sensor 32 in the longitudinal direction on both sides of the hole 44 remains fully serviceable.

An impact buffer 42 made from dimensionally stable material, which rests on the first closing edge 22 and extends essentially at right angles to the latter through the film pressure sensor 32, is introduced into the hole 44 in the hollow section 10 and the film pressure sensor 32. The free end of the impact buffer 42 may lie within the hollow space 12 or project through a suitable opening 46 in the wall of the hollow section 10 facing away from the first closing edge 22.

The impact buffer 42 advantageously comprises a sleeve 48 arranged essentially at right angles to the first closing edge 22 and a rivet 50, which can be introduced into the sleeve 48. The inside diameter of the sleeve corresponds essentially to the outside diameter of the rivet shank, but the length of the latter is smaller than the depth of the sleeve hole. Consequently in the assembled condition a hollow chamber 52 is formed in the sleeve, which imparts a certain flexibility to the impact buffer 42, so that the closing element is braked gently when the second closing edge strikes the impact buffer.

It should be noted that trapping in the area of the impact buffer 42 can be detected despite the hole in the film pressure sensor 32 in this area. In fact a trapping force F striking the legs 16 is transmitted by the legs 16 over a greater length to the side areas 28, so that the resulting deformation of the side areas 28 deflects the film pressure sensor 32 also in zones which are adjacent to the hole in the longitudinal direction. Consequently reliable tripping of the antitrapping device is ensured.

A further variant of an anti-trapping device is shown in FIG. 4. In this embodiment an additional membrane 54 made from flexible material, which is preferably connected in one piece to the legs 16, is drawn in between the legs 16 at a certain distance from the hollow section 10. This membrane 54 also reliably prevents direct striking of the side window 4 on the hollow section 10. During closing of the window 4 this enters the membrane 54 and the movement is gently braked without imposition of a direct load on the switching element 32. Entry of the window 4 into the membrane 54 imparts a lateral force to the two legs 16 in the direction of the side window 4, with the result that the sealing lips 20 are pressed firmly against the window 4, so that their sealing effect is significantly improved. To maintain contact pressure of the sealing lips 20 on the side window 4 as uniformly as possible, the additional membrane 54 is preferably retracted over the full length of the hollow section 10.

What is claimed is:

1. A device for detection of a trapping condition relating to a power-operated closing element, wherein a trapping condition occurs when an object is trapped between the power operated closing element and a frame which borders said closing element, said device comprising:
   a) an elastic hollow section to be arranged along a first closing edge of said frame, said elastic hollow section comprising a central area and at least one side area, said central area and said side area extending side by side along said first closing edge, said central area and said side area each comprising an upper portion and an lower portion, said upper portion of said central area and said upper portion of said side area facing said first closing edge and said lower portion of said central area and said lower portion of said side area facing away from said first closing edge, wherein said upper portion of said side area is more deformable than said upper portion of said central area,
   b) a switching element, which is arranged within said elastic hollow section, said switching element comprising an active area, which is arranged in said central area of said elastic hollow section and
   c) at least one force transmitter, said force transmitter being arranged along said hollow section in a force transmitting relationship to said side area of said hollow section and said force transmitter extending generally towards said power operated closing element, so that a trapping force is transmitted by said at least one force transmitter to said side area of said hollow section.

2. The device according to claim 1, wherein said upper portion of said central area includes an elevation which projects into a hollow space of said hollow section.

3. The device according to claim 1, wherein an hollow space of said hollow section is curved concavely outwards in said lower portion of said central area.

4. The device according to claim 1, wherein said force transmitter is connected to said lower portion of said side area.

5. The device according to claim 1, further comprising a spacer, said spacer covering said active area of said switching element in a part of said hollow section.

6. The device according to claim 5, wherein said spacer comprises an impact buffer, said impact buffer extending away from said first closing edge through suitable openings in the hollow section and the switching element, a first end of the impact buffer resting on the first closing edge and a second end of the impact buffer extending beyond the switching element.

7. The device according to claim 6, wherein said impact buffer comprises a sleeve and a rivet, said sleeve being arranged essentially at right angle to the first closing edge and said rivet being introducable into said sleeve, wherein said sleeve comprises an inside diameter and a depth and said rivet comprises a rivet shank having an outside diameter and a length, said outside diameter of said rivet shank corresponding essentially to said inside diameter of said sleeve and said length of said rivet shank being smaller than said depth of the sleeve.

8. The device according to claim 5, wherein said spacer comprises a clamp, said clamp encompassing said hollow section.

9. The device according to claim 8, wherein said clamp consists of an elastic material.

10. The device according to claim 1, wherein said elastic hollow section comprises two side areas, one side area being arranged on either side of said central area of said hollow section, and wherein said device comprises two force transmitters, each of said force transmitter being arranged along said hollow section in an abutting relationship to one of said side areas of said hollow section, said device further comprising a membrane made from flexible material, said membrane extending between the first and the second force transmitter at a certain distance from said hollow section.

11. A device for detection of a trapping condition relating to a power-operated closing element, wherein a trapping condition occurs when an object is trapped between the power operated closing element and a frame which borders said closing element, said device comprising:

a) an elastic hollow section to be arranged along a first closing edge of said frame, said elastic hollow section comprising a central area and at least one side area, said central area and said side area extending side by side along said first closing edge, said central area and said side area each comprising an upper portion and an lower portion, said upper portion of said central area and said upper portion of said side area facing said first closing edge and said lower portion of said central area and said lower portion of said side area facing away from said first closing edge, wherein said upper portion of said side area is more deformable than said upper portion of said central area, b) a switching element, which is arranged within said elastic hollow section, said switching element comprising an active area, which is arranged in said central area of said elastic hollow section and c) at least one force transmitter, said force transmitter being arranged along said hollow section in an abutting relationship to said side area of said hollow section and said force transmitter extending generally towards said power operated closing element, so that a trapping force is transmitted by said at least one force transmitter to said side area of said hollow section.

12. The device according to claim 11, said upper portion of said central area includes an elevation which projects into a hollow space of said hollow section and wherein said hollow space of said hollow section is curved concavely outwards in said lower portion of said central area.

13. The device according to claim 12, wherein said force transmitter is connected to said lower portion of said side area.

14. The device according to claim 13, further comprising a spacer, said spacer covering said active area of said switching element in a part of said hollow section.

15. The device according to claim 14, wherein said spacer comprises an impact buffer made, said impact buffer extending essentially at a right angle to the first closing edge through suitable openings in the hollow section and the switching element a first end of the impact buffer resting on the first closing edge and a second end of the impact buffer extending beyond the switching element.

16. The device according to claim 15, wherein said impact buffer comprises a sleeve and a rivet, said sleeve being arranged essentially at right angle to the first closing edge and said rivet being introducable into said sleeve, wherein said sleeve comprises an inside diameter and a depth and said rivet comprises a rivet shank having an outside diameter and a length, said outside diameter of said rivet shank corresponding essentially to said inside diameter of said sleeve and said length of said rivet shank being smaller than said depth of the sleeve.

17. The device according to claim 14, wherein said spacer comprises a clamp, said clamp encompassing said hollow section.

18. The device according to claim 17, wherein said clamp consists of an elastic material.

19. The device according to claim 11, wherein said elastic hollow section comprises two side areas, one side area being arranged on either side of said central area of said hollow section, and wherein said device comprises two force transmitters, each of said force transmitter being arranged along said hollow section in an abutting relationship to one of said side areas of said hollow section, said device further comprising a membrane made from flexible material, said membrane extending between the first and the second force transmitter at a certain distance from said hollow section.

20. A device for detection of a trapping condition relating to a power-operated closing element, wherein a trapping condition occurs when an object is trapped between the power operated closing element and a frame which borders said closing element, said device comprising:

a) an elastic hollow section to be arranged along a first closing edge of said frame, said elastic hollow section comprising a central area and at least one side area, said central area and said side area extending side by side along said first closing edge, said central area and said side area each comprising an upper portion and an lower portion, said upper portion of said central area and said upper portion of said side area facing said first closing edge and said lower portion of said central area and said lower portion of said side area facing away from said first closing edge, wherein said upper portion of said side area is more deformable than said upper portion of said central area, b) a film pressure sensor, which is arranged within said elastic hollow section, said film pressure sensor comprising an active area, which is arranged in said central area of said elastic hollow section and at least one force transmitter, said force transmitter being arranged along said hollow section in an abutting relationship to said side area of said hollow section and said force transmitter extending generally towards said power operated closing element, so that a trapping force is transmitted by said at least one force transmitter to said side area of said hollow section.

\* \* \* \* \*

UNITED STATES PATENT AND TRADEMARK OFFICE
CERTIFICATE OF CORRECTION

PATENT NO.    : 6,373,005 B1
DATED         : April 16, 2002
INVENTOR(S)   : Griesbach et al.

It is certified that error appears in the above-identified patent and that said Letters Patent is hereby corrected as shown below:

<u>Title page,</u>
Item [73], Assignee, please delete the second assignee "Daimler-Benz AG" and replace it with -- DaimlerChrysler AG --.

Signed and Sealed this

Seventeenth Day of September, 2002

Attest:

Attesting Officer

JAMES E. ROGAN
*Director of the United States Patent and Trademark Office*